(12) United States Patent
Adigrat et al.

(10) Patent No.: US 9,069,114 B2
(45) Date of Patent: Jun. 30, 2015

(54) BEND-RESISTANT SINGLE-MODE OPTICAL FIBRE

(75) Inventors: Antonio Adigrat, Milan (IT); Franco Cocchini, Milan (IT); Antonio Collaro, Milan (IT); Antonello Schiaffo, Milan (IT)

(73) Assignee: PRYSMIAN S.P.A., Milan (IT)

( * ) Notice: Subject to any disclaimer, the term of this patent is extended or adjusted under 35 U.S.C. 154(b) by 131 days.

(21) Appl. No.: 13/811,142

(22) PCT Filed: Jul. 23, 2010

(86) PCT No.: PCT/EP2010/060697
§ 371 (c)(1),
(2), (4) Date: Jan. 18, 2013

(87) PCT Pub. No.: WO2012/010212
PCT Pub. Date: Jan. 26, 2012

(65) Prior Publication Data
US 2013/0121655 A1 May 16, 2013

(51) Int. Cl.
*G02B 6/02* (2006.01)
*G02B 6/036* (2006.01)

(52) U.S. Cl.
CPC *G02B 6/02* (2013.01); *G02B 6/023* (2013.01); *G02B 6/02333* (2013.01); *G02B 6/02357* (2013.01); *G02B 6/0365* (2013.01)

(58) Field of Classification Search
CPC ........................................ G02B 6/023
USPC ........................................... 385/123
See application file for complete search history.

(56) References Cited

U.S. PATENT DOCUMENTS

| 7,450,807 B2 | 11/2008 | Bickham et al. |
| 7,555,187 B2 | 6/2009 | Bickham et al. |
| 2003/0200770 A1 | 10/2003 | Johnson |
| 2007/0104437 A1 | 5/2007 | Bookbinder et al. |
| 2008/0166094 A1* | 7/2008 | Bookbinder et al. ......... 385/124 |
| 2008/0205839 A1 | 8/2008 | Bickham et al. |
| 2008/0279515 A1 | 11/2008 | Bickham et al. |
| 2009/0032983 A1 | 2/2009 | Bookbinder et al. |
| 2009/0060436 A1 | 3/2009 | Bickham et al. |

(Continued)

FOREIGN PATENT DOCUMENTS

| WO | WO 2008/005233 A2 | 1/2008 |
| WO | WO 2009/099579 A2 | 8/2009 |

(Continued)

OTHER PUBLICATIONS

International Search Report from the European Patent Office for International Application No. PCT/EP2010/060697, mailing date Apr. 27, 2011.

(Continued)

*Primary Examiner* — Mike Stahl
*Assistant Examiner* — Kajli Prince
(74) *Attorney, Agent, or Firm* — Finnegan, Henderson, Farabow, Garrett & Dunner, L.L.P.

(57) ABSTRACT

A single-mode optical fiber for transmitting optical signals includes a central core region for guiding the optical signals, and a cladding region surrounding the core region and including a void-containing annular layer containing randomly distributed voids, wherein the void-containing layer is doped with fluorine at a concentration of less than 1 wt % and has a radial thickness equal to or smaller than 3 μm.

9 Claims, 3 Drawing Sheets

(56) References Cited

U.S. PATENT DOCUMENTS

2009/0185780 A1    7/2009   Matthijsse et al.
2010/0124396 A1*   5/2010   Coon et al. .................. 385/125

FOREIGN PATENT DOCUMENTS

WO    WO 2010/031420 A1    3/2010
WO    WO 2010/056673 A1    5/2010

OTHER PUBLICATIONS

Written Opinion of the International Searching Authority from the European Patent Office for International Application PCT/EP2010/060697, mailing date Apr. 27, 2011.

ITU-T Recommendation G.652, "Characteristics of a Single-Mode Optical Fibre and Cable", ITU-T Telecommunication Standardization Sector of ITU, Series G: Transmission Systems and Media, Digital Systems and Networks, Transmission Media Characteristics—Optical Fibre Cables, cover page, pp. i-iii, and pp. 1-14, (2003).

CEI IEC 60793-1-44, "Opticals Fibres—Part 1-44: Measurement Methods and Test Procedures—Cut-Off Wavelength", International Standard, International Electrotechnical Commission, cover page, and pp. 1-43, (2001).

CEI IEC 60793-1-45, "Opticals Fibres—Part 1-45: Measurement Methods and Test Procedures—Mode Field Diameter", International Standard, International Electrotechnical Commission, cover page, and pp. 1-59, (2001).

CEI IEC 60793-1-20, "Opticals Fibres—Part 1-20: Measurement Methods and Test Procedures—Fibre Geometry", International Standard, International Electrotechnical Commission, cover page, and pp. 1-53, (2001).

* cited by examiner

BEND-RESISTANT SINGLE-MODE OPTICAL FIBRE

CROSS REFERENCE TO RELATED APPLICATION

This application is a national phase application based on PCT/EP2010/060697, filed Jul. 23, 2010, the content of which is incorporated herein by reference.

BACKGROUND OF THE INVENTION

1. Field of the Invention

The present invention relates to a single-mode optical fibre and in particular to a single mode optical fibre exhibiting low bending losses.

2. Description of the Related Art

The use of single-mode optical fibres in fibre-to-the-premises (FTTP) applications, including fibre-to-the-home (FTTH) and fibre-to-the-building (FTTB) applications, generally require low bending loss of optical signals transmitted through the fibres, also under stringent installation constraints that may impose tight bend radii, e.g., due to sharp cornering in buildings or compression of optical fibres. In particular, cabling and hardware applications aimed to miniaturize passive field equipment, e.g., local convergence cabinets or storage boxes, and the development of multi-dwelling units (MDUs) require fibre designs with superior bending capabilities. In addition, coarse wavelength division multiplexing systems (CWDM) and passive optical network (PON) systems may also need employment of bend-insensitive optical fibres.

Recently, microstructured optical fibres have been developed for single-mode transmission and low bending loss. These fibres typically include a solid central core surrounded by a hole-containing silica cladding, wherein the holes are arranged in a random or non-periodic spatial distribution.

WO 2008/005233 discloses a microstructured optical fibre comprising a core region and a cladding region surrounding the core region, the cladding region comprising an annular hole-containing region comprised of non-periodically disposed holes. The core region and cladding region is said to provide improved bend resistance and single mode operation at wavelengths greater than or equal to 1500 nm, in some embodiments greater than 1260 nm. The fibres disclosed in this document are said to be possibly produced by relatively low cost manufacturing process, because expensive dopants such as fluorine and/or germania can be avoided in the hole-containing region, if desired, and the stack and draw manufacturing process of arranging spatially periodically disposed holes in the glass part of the optical fibre can likewise be avoided, if desired. It is further mentioned that, alternatively, the methods disclosed herein can be used simply to add holes or voids to a cladding of a fibre which is doped with one or more of germania, phosphorous, aluminium, ytterbium, erbium, fluorine or other conventional fibre dopant materials, or which also contains spatially periodically disposed holes in the cladding, to increase the bend resistance thereof.

A microstructured optical fibre in which the cladding region comprises an annular void-containing region comprised of non-periodically disposed voids is described also in WO 2009/099579.

Fluorine-doped optical fibres can be tailored to a number of different applications. U.S. 2009/0185780 relates to a transmission fibre with an improved resistance to high-dose radiation having a refractive index that is uniformly depressed with respect to the profile of a standard single-mode fibre.

U.S. 2003/0200770 discloses a method of making a fluorine-doped soot. The ability to include fluorine in a preform is generally considered an important aspect of producing an optical fibre with a fluorine-doped region. Deposited fluorine has shown to be a volatile compound and to exhibit a significant migration from the regions of interest. The solution described in this document is said that it can be used to increase the concentration of fluorine doping species in an atmosphere for fluorine doping a soot particle during deposition.

U.S. Pat. No. 7,555,187 relates to an optical fibre having an effective area larger than 95 $\mu m^2$ and bend loss of ≤0.7 dB/turn on a 20 mm diameter mandrel. The disclosed fibre comprises a glass core and a glass cladding comprising a first and second annular region and a third annular region (outer region), wherein the second annular region comprises a minimum relative refractive index relative to the third annular region lower than zero, preferably equal to or lower than −0.3%. The document states that, in a set of embodiments, the second annular region comprises silica based glass (either pure silica, or silica doped with for example, germanium, aluminium, phosphorus, titanium, boron, and fluorine) with a plurality of closed randomly dispersed holes, which provide an effective refractive index which is low, e.g. compared to pure silica.

Large effective area optical fibres have been used for long-distance telecommunication systems, as generally a large effective area reduces the non-linear optical effects. However, an increase in effective area is known to typically result in an increase of macrobending induced losses.

U.S. 2008/0279515 relates an optical fibre comprising a silica-based core and cladding, wherein the core comprises an alkali metal oxide selected from the group consisting of $K_2O$, $Na_2O$, $LiO_2$, $Rb_2O$, $Cs_2O$ and mixtures thereof in an average concentration in said core between about 10 and 10000 ppm by weight. The cladding which surrounds the core includes at least a first annular region having an index delta percent lower than that of the core, and a second annular region having an index delta percent lower than that of the first annular region. The second annular region is said to preferably comprise randomly distributed voids, fluorine, or mixtures thereof.

An optical fibre including a void-containing region with a random void distribution can be manufactured during formation of the preform by a sintering process in which gases with low-solubility in the materials forming the fibre, usually silica-based materials, remain trapped and form voids. The preform can be manufactured in two main steps: first, a glass core rod including the preform core, which is preferably void-free, is produced by deposition and then consolidated, and, second, a preform outer cladding is formed around the glass core rod by deposition and then consolidated to form voids within the preform cladding layer. The resulting consolidated preform typically exhibits an annular void-containing region including a random distribution of voids, which starts at about the outer surface of the core glass rod and extends radially within the cladding for a certain radial thickness. Radial thickness (or width) of the void-containing annular region and local void density within the annular region may widely vary in dependence on the sintering process conditions, such as consolidation time, temperature gradient in the furnace and percentage of volume of low-solubility gases during consolidation.

The drawing process following the formation of the preform, in which the preform glass flows from the original cross-sectional area of the preform to the desired cross-sectional area of the fibre, have an effect on the voids. Typically, the stretching of the preform into the optical fibre changes the void shape from spherical to elongated.

In a microstructured optical fibre with a random-void distribution, bend resistance can depend on the thickness of the void-containing region and/or on the density of the voids in said region. In particular, bend resistance has been seen to be correlated with the product of the local void density and the cross-sectional area of the void-containing region. Generally, the higher the density of the voids, the larger the depth of the refractive index with respect to the outer cladding region, taken as a reference refractive index value, in other words, the larger in absolute value the minimum relative refractive index of the depressed-index void-containing region.

Bend resistant single-mode optical fibres with an annular ring region of low relative refractive index are disclosed in U.S. Pat. No. 7,450,807. In one set of embodiments, the annular ring region comprises silica glass having a dopant selected from the group consisting of germanium, aluminium, phosphorus, titanium, boron, and fluorine. In another set of embodiments, the annular ring region comprises silica glass with a plurality of holes.

The profile volume, $V_3$, of the annular ring region extending outwardly from an inner radius $R_2$ to an annular ring region radius $R_3$ is defined in U.S. Pat. No. 7,450,807 as:

$$V_3 = 2\int_{R_2}^{R_3} \Delta_3(r) dr \qquad (1)$$

where $\Delta_3$ is the relative refractive index across the region.

SUMMARY OF THE INVENTION

The Applicant has observed that, in order to obtain a macrobending performance satisfying the requirements typical of FTTP applications, the thickness of the void-containing region in a microstructured optical fibre should be sufficiently large. From the teaching of U.S. Pat. No. 7,450,807, for example, the Applicant has noticed that a relative refractive index percent of at least −0.63% in a cladding region is required for obtaining some improvement of the macrobending resistance.

The Applicant has realised that an optical fibre comprising a void-containing region having a relatively large thickness is often affected by diameter instability during manufacturing, especially during the drawing of the preform. The manufacturing of microstructured optical fibres having void-containing regions of thickness larger than 5 μm can be affected by diameter instability that, according to, for example, ITU-T 652 (March 2003) cannot be higher than 125±0.7 μm. The diameter control by on-line monitoring systems typically employed for measuring the outer diameter of the fibre during the drawing process is not easily achieved in the presence of a relatively large diameter instability, such as oscillations exceeding about 1 μm or of large frequency spatial variations of diameter (e.g. diameter variations within a fibre length of less than 1 m).

The Applicant has considered that relatively high fluorine content in the soot preform is required to generate a depressed cladding region that achieves a macrobending performance satisfying the typical demands for FTTP applications. For example, a fluorine-doped depressed cladding region of average refractive index percent of −0.6%, nearly corresponding to fluorine content of about 2 wt %, compared to undoped silica, may not be sufficient to obtain a loss at 1550 nm lower than 0.1 dB/turn on a mandrel of 10 mm diameter. On the other hand, high fluorine content in the soot, which provides for a large depression of the refractive index in the fibre cladding, is generally not easily achievable, due to the difficulty in retaining fluorine at high levels into the silica soot preform that undergoes heating. Environmental and economic considerations may also be a concern in manufacturing plants where fluorine is employed in substantial amounts.

The Applicant has found that low bending loss can be obtained in an optical fibre comprising a void-containing region by light fluorine doping of the void-containing region. In particular, the Applicant has found that the presence of a light fluorine doping makes possible to achieve very low bending losses in an optical fibre containing a void-containing region of reduced radial thickness (equal to or less than 3 μm) such that substantial diameter oscillations during manufacturing of the fibre can be avoided. A light fluorine doping content can be easily obtained by standard manufacturing techniques, such as by exposing the preform soot to a fluorine-containing gas during the consolidation process.

According to an aspect, the present invention relates to a single-mode optical fibre for transmitting optical signals comprising: a central core region for guiding the optical signals, and a cladding region surrounding the core region and comprising a void-containing annular region containing randomly distributed voids, wherein the void-containing region is doped with fluorine at a concentration of less than 1 wt % and has a radial thickness equal to or smaller than 3 μm.

Preferably, the thickness of the void-containing region is of from 1.5 μm to 3 μm. In some particularly preferred embodiments, the thickness of the void-containing region is of from 2 μm to 3 μm.

Preferably, the fluorine concentration by weight percent in the void-containing region is equal to or larger than 0.1 wt % and less than 1 wt %. More preferably, the fluorine concentration is of from 0.1 wt % to 0.7 wt %.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

BRIEF DESCRIPTION OF THE DRAWINGS

Reference will now be made in detail to the present preferred embodiments of the invention, examples of which are illustrated in the accompanying drawings.

DETAILED DESCRIPTION OF THE INVENTION

Within the present description, the cable cut-off wavelength of an optical fibre is the cut-off wavelength value measured according to the cut-off test Method A described in the IEC-60793-1-44 (2001-07) standard.

The mode field diameter (MFD) of an optical fibre is measured according to the IEC 60793-1-45 (2001-07) standard, at a wavelength of 1310 nm.

The MAC number is defined as the ratio between mode field diameter (MFD) measured at 1310 nm, in microns, and the cable cut-off wavelength, in microns.

Macrobending loss (in dB) is the attenuation increase at a given wavelength (1625 nm or 1550 nm) measured at room temperature in a fibre wound for five turns around a mandrel having a diameter of 15 mm or of 10 mm as it will be specified in the examples. Measurements will be then normalised to a single-turn macrobending.

In the present context, the relative refractive index percent is defined as $\Delta_i\% = 100 \times (n_i^2 - n_0^2)/2n_i^2$ where $n_i$ is the maximum refractive index (positive or negative) in the i-region of the refractive index profile and $n_0$ is the refractive index of the outer cladding, typically made of undoped silica. The relative refractive index is defined as $\Delta_i = (n_i - n_0)$. With undoped silica is meant silica glass non-intentionally doped. The relative refractive index or relative index percent is said to be negative if it is less than the reference refractive index, $n_0$. A region with negative relative refractive index is referred to as a depressed-index region. The value of a region with positive relative refractive index is taken to be the maximum value within the region.

Figure 1:
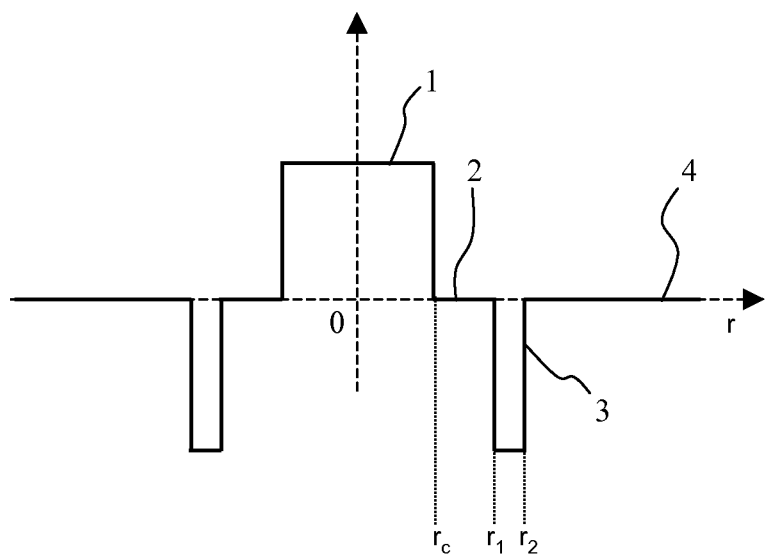
FIG. 1 is a schematic diagram of a relative refractive index profile of the fibre according to some preferred embodiments of the present invention.

FIG. 1 is a diagram schematically illustrating the relative refractive index profile of an optical fibre according to some embodiments of the invention, schematically showing the different regions of the profile as a function of the radial distance r from the centre of the fibre, i.e. the vertical axis represents the centreline of the optical fibre (r=0). The optical fibre comprises a core region 1 surrounded by a cladding region. The cladding region comprises an inner annular region 2 extending radially outwardly the core region 1 and in contact with the core region, an intermediate annular region 3 extending radially outwardly the inner annular region 2 and an outer annular region 4 extending radially outwardly the intermediate annular region 3. Preferably, the intermediate annular region 3 is in contact with the inner annular region 2. Preferably, the outer annular region 4 is in contact with the intermediate annular region 3. In many embodiments, the outer annular region 4 is the outer cladding extending out through the fibre outer diameter. As the outer cladding of single-mode optical fibres used for transmission is generally made of undoped silica, the relative index profile takes as a reference ($\Delta_0=0$) the refractive index of the outer cladding. The intermediate annular region 3 is a void-containing region comprising a plurality of voids randomly distributed across the region and being doped with fluorine. The presence of voids across the intermediate annular region and of fluorine doping decrease the refractive index resulting in an average negative relative refractive index, of absolute value $\Delta_3$, whose magnitude in general depends on the local void density and on the fluorine content. The intermediate annular region is thus a depressed-index region.

According to the preferred embodiments of the present invention, the intermediate annular region has a low fluorine doping. Preferably, the intermediate annular region is made of silica doped with fluorine at a concentration by weight percent of less than 1 wt %, more preferably equal to or larger than 0.1 wt % and less than 1 wt %.

The core region 1 has a positive relative index percent $\Delta_1$ and is a central region extending from the fibre centreline to an outer core radius, $r_C$, the latter being defined according to IEC 60793-1-20 (2001-09), Annex C. The intermediate annular region 3 extends radially from the outer radius, $r_1$, of the inner annular region 2 within the outer cladding to an outer radius $r_2$ for a radial thickness, $t_2=(r_2-r_1)$, which is herein referred to as the radial thickness of the depressed-index region or of the void-containing region. In the preferred embodiments, the inner annular region 2 extends from the outer core radius, $r_C$, to a first outer clad radius, $r_1$, defining a radial thickness $t_1=(r_1-r_C)$.

The fibre core region 1 is preferably made of silica doped with a doping element that increases the refractive index, such as germanium, so as to form a step-index profile with positive relative refractive index $\Delta_1$. Preferably, $\Delta_1$ is of from 0.29% to 0.35%, more preferably of from 0.30% to 0.34%.

In some embodiments, core region 1 can be made of a plurality of regions having positive relative refractive index.

The inner annular region 2 is preferably made of the same material as that of the outer annular region 4, which is preferably made of undoped silica.

A geometrical parameter that represents the radial distance from the depressed-index region to the core region is the core-to-clad ratio, defined as the ratio between the outer radius of the core $(r_c)$ and the inner radius of the void-containing annular region $(r_1)$. In general, the core-to-clad ratio of the preform is preserved in the drawn optical fibre.

Preferably, the core-to-clad ratio is of from 0.33 to 0.40, more preferably of from 0.36 to 0.38.

Preferably, the local void density of the microstructured fibre is of from 1% to 10%, more preferably of from 1 to 4%. The local density of voids, i.e., within the void-containing region, is defined herein as the ratio between the total area of the voids in the region and the total area of the region, when the optical fibre is viewed in a cross-section taken perpendicular to the fibre longitudinal axis.

Preferably, the radial thickness $t_2$ of the depressed-index region is equal to or smaller than 3 μm, more preferably equal to or greater than 1.5 μm and equal to or smaller than 3 μm. In some preferred embodiments, when a high performance optical fibre is desired (e.g. less than 0.1 dB/turn at 1550 nm on a mandrel of 10 mm diameter), the thickness $t_2$ is of from 2 to 3 μm.

With a random distribution of voids is generally meant that voids are irregular in their location across the region. Herein, the term void may indicate empty holes, air-filled holes or bubbles containing gases trapped within them, and in general a defect having a refracting index significantly smaller than that of the surrounding matrix. Generally, but not exclusively, voids have a refractive index equal or close to 1.

Preferably, the fluorine doping is performed during the consolidation process following the soot deposition of a silica layer over the core blank, i.e. the core glass rod, of a preform. The consolidation process can be carried out by using a fluorine containing gas such as $SF_6$, $CF_4$, $SiF_4$. The fluorine-containing gas diffuses into the soot preform and reacts with the soot, thereby doping the silica soot with fluorine. Subsequently, or at the same time of, the exposure of the silica to the fluorine containing gas, sintering of the soot preform is performed in an atmosphere of large molecule gas (e.g. Ar, $O_2$ or $N_2$). The large molecules remain trapped in the glass preform, resulting in micronic or sub-micronic random holes in the fibre after drawing, which may extend up to more than few meters along the fibre.

In some preferred embodiments, a $Cl_2$ flow is employed during the consolidation process. Preferably, the $Cl_2$ flow is maintained relatively low during the consolidation process, e.g. lower than 1.7 l/min, so as to obtain an optical fibre with very low water content. Preferably, the optical fibre exhibits a water peak at 1380 nm less than 0.05 dB/km, more preferably less than 0.03 dB/km.

EXAMPLES

Example 1

The optical fibre preform was produced according to the following process. By using an Outside Vapour Deposition (OVD) process, approximately 110 grams of silica soot was deposited onto a $GeO_2$ doped silica glass rod of about 1 meter length and 10.6 mm diameter with step index profile having a relative refractive index percent, $\Delta_1$, of about 0.31%, and core-to-clad diameter ratio of about 0.38. An external layer of the $GeO_2$ doped glass rod surrounding the Ge-doped layer is made of undoped silica glass and will form the inner annular region of the cladding region indicated with 2 in FIG. 1. The preform formed by the silica soot deposited on the glass rod was maintained in a hot zone at about 1000° C. of a consolidating furnace for 120 minutes in a 15 l/min (liter/minute) He+1.7 l/min $Cl_2$ flow and then for 30 minutes in 15 l/min Ar+0.25 l/min $SF_6$+1.7 l/min $Cl_2$ flow. Then, the soot cladding was sintered by down driving in a hot zone at 1490° C. of the consolidating furnace, at a 100° C./min temperature increase in a 15 l/min Ar+0.25 l/min $SF_6$+1.7 l/min $Cl_2$ flow. The assembly was then re-down driven (i.e. a second time) through the hot zone at a 50° C./min temperature increase still in a 15 l/min Ar+0.25 l/min $SF_6$+1.7 l/min $Cl_2$ flow. The assembly was then re-down driven (i.e. a third time) through the hot zone at a 26° C./min temperature increase in a 15 l/min Ar+1.7 l/min $Cl_2$ flow. An Ar+$Cl_2$ atmosphere was maintained up to the end of the process. The assembly was then re-down driven (i.e. a fourth time) through the hot zone at a 13° C./min temperature increase. The assembly was then re-down driven (i.e. a fifth time) through the hot zone at a 7° C./min temperature increase.

By the consolidation process in a fluorine containing atmosphere as described above, a silica soot doped with fluorine and containing gases trapped in the soot forming a random distribution of voids was obtained. The fluorine doping in the intermediate annular region was estimated to be equal to or greater than 0.4 wt % and lower than 0.7 wt %.

Subsequently, nearly 6950 grams of silica soot was deposited on the preform and sintered in a standard way in He+$Cl_2$ atmosphere. The silica soot will form the outer cladding of the optical fibre. The preform was then placed for 12 h in a holding oven at 1000° C. with Ar.

The preform manufactured according to the above described process was placed in a standard drawing tower, equipped with a measurement apparatus of the fibre outer diameter. In particular, the outer diameter was measured by means of a system for on-line control of the fibre as that described in WO 2010/031420. The control system was set to maintain the outer diameter of 125±1 μm, for example by adjusting the drawing speed.

The drawing tower was equipped with an induction furnace having a 25 cm height hot zone (element length) and the fibre was drawn at a drawing speed of 16 m/s and a drawing tension of 180 grams. The optical properties of the fibre obtained by the above described process were determined by standard optical measurement techniques on several fibre length sections wound up on bobbins and having typical length of at least a few km. The estimated averaged values were:

Zero wavelength dispersion=1316 nm
MFD=8.5 μm
Cable cut-off wavelength=1283 nm
MAC number=6.65
Macrobending @1625 nm on 15 mm diameter mandrel=0.009 dB/turn
Macrobending @1550 nm on 10 mm diameter mandrel=0.015 dB/turn.

Figure 2:
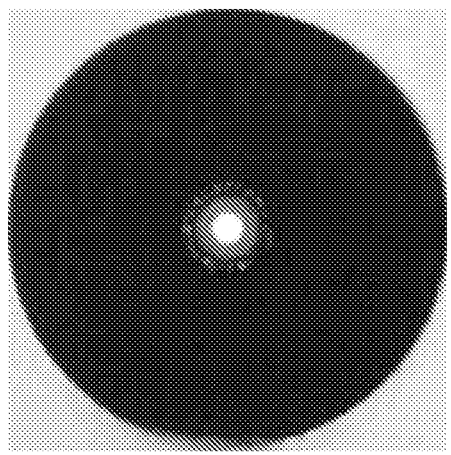
FIG. 2 is an image of a cross-section taken on an optical measurement bench of an optical fibre according to an embodiment of the present invention.

Several spans of the drawn optical fibre were measured off-line, after completion of the drawing process. The internal structure of the optical fibre, and in particular the radial thickness of the void-containing annular region and the local void density within the annular region, was performed by cutting the optical fibre to be examined in portions of about 2 m length and by observing the cross section thereof through a microscope or television camera. In particular, a PK 2400 measuring instrument produced by the Photon Kinetics company was used, in which light at 633 nm from a light source is converged in the core of the fibre, according to the measurement procedure specified by the European standard IEC-793-1-A2. The image of a cross-section is reported in FIG. 2. The average fibre diameter was 124.81 μm with a standard deviation of 0.45 μm from the average value, thus indicating a low diameter instability during the drawing process.

The randomly distributed voids across the void-containing region had an average diameter of less than 1 μm. From the off-line structural measurements of the optical fibre, it was observed that process had produced an optical fibre having a local void density of 2%. The radial thickness of the region containing the voids ranged from 2.5 to 2.8 μm.

Therefore, the fibre of the present example showed excellent macrobending performances and low diameter instability.

Example 2

By using an OVD process, approximately 120 grams of silica soot was deposited onto a $GeO_2$ doped silica glass rod of about 1 meter length and 10.6 mm diameter with a step-index profile of the core having a relative refractive index percent, $\Delta_1$, equal to about 0.30%, and core-to-clad diameter ratio of about 0.36. The preform was subjected to the same consolidation process as that of example 1. The fluorine content due to exposure of the soot to fluorine-containing gases was estimated to be equal to or greater than 0.4 wt % and lower than 0.7 wt % in the void-containing region.

After the consolidation process, nearly 6150 grams of silica soot was deposited on the preform and sintered in a standard way in He+$Cl_2$ atmosphere. The preform was then placed for 12 h in a holding oven at 1000° C. with argon.

The preform was drawn on the same apparatus of example 1 at a drawing speed of 22 m/s and a drawing tension of 180 grams. The fibre outer diameter was controlled by the on-line control system of example 1, set to maintain the outer diameter of the fibre at 125±1 μm. The optical properties averaged from measurements on several fibre length sections wound up on respective bobbins were:

Zero wavelength dispersion=1318 nm
MFD=8.8 μm
Cable cut-off wavelength=1220 nm
MAC number=7.25
Macrobending @1625 nm on 15 mm diameter mandrel=0.063 dB/turn
Macrobending @1550 nm on 10 mm diameter mandrel=0.075 dB/turn Several spans of the drawn optical fibre were measured off-line, after completion of the drawing process by using the measuring method described in example 1. The average fibre outer diameter was 124.75 μm with a standard deviation of 0.35 μm from the average value. The fibre cross-sections showed a ring of holes randomly distributed, with an average diameter on the section of about 1 μm or less. The radial thickness of the void-containing region was observed to range from 2.9 μm to 3.0 μm.

Figure 3:
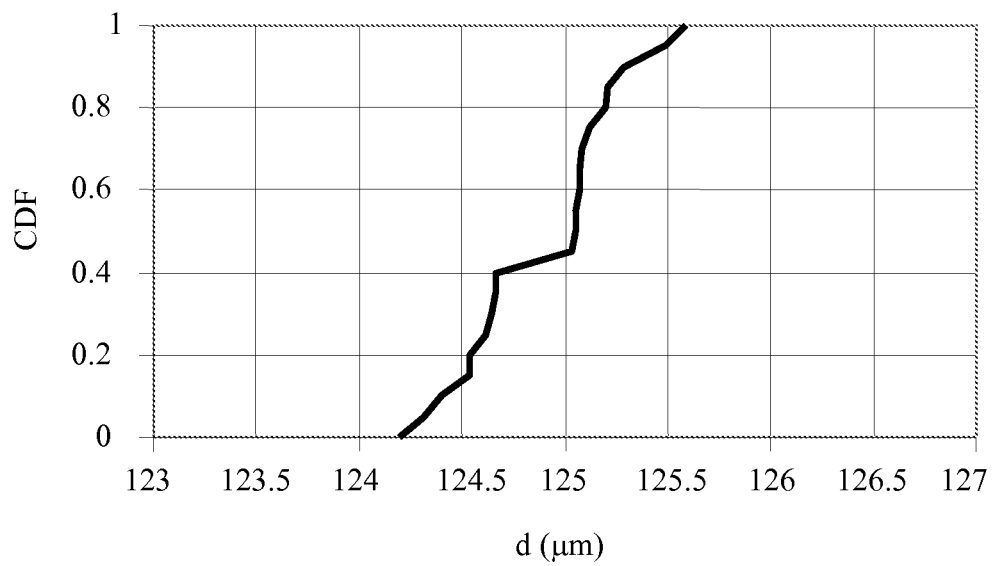
FIG. 3 is plot showing the cumulative distribution function (CDF) of the outer diameter of a fibre according to an embodiment of the present invention, measured on a first length section of a fibre wound up on a bobbin.
Figure 4:
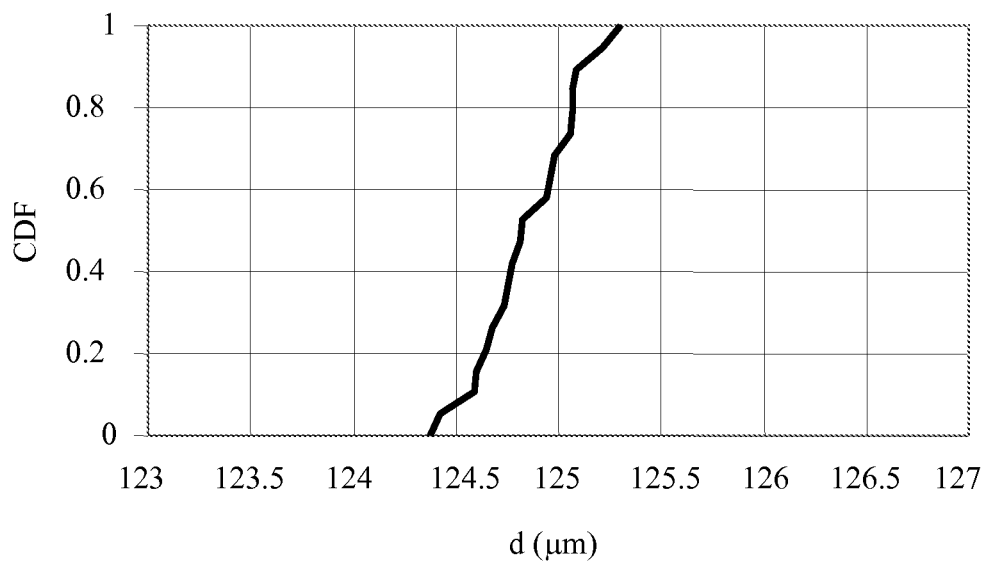
FIG. 4 is plot showing the cumulative distribution function (CDF) of the outer diameter of the fibre of the embodiment referred to in FIG. 3, measured on a second length section of the fibre wound up on a bobbin.

FIGS. 3 and 4 are a plot showing the cumulative distribution function (CDF) of the fibre outer diameter (d) measured on two different length sections wound up on a respective bobbin. The data reported in FIG. 3 have standard deviation of 0.44 μm, whereas data reported in FIG. 4 have standard deviation of 0.25 μm, both values denoting low diameter instability, fully compliant with a 125±0.7 μm specification.

Spectral attenuation measurements were performed on several bobbins of optical fibre by using a commercial PK 2200 measurement bench. Measured average attenuation values were:

Attenuation @1310 nm=0.333 dB/km
Attenuation @1380 nm=0.293 dB/km
Attenuation @1550 nm=0.199 dB/km.

Figure 5:
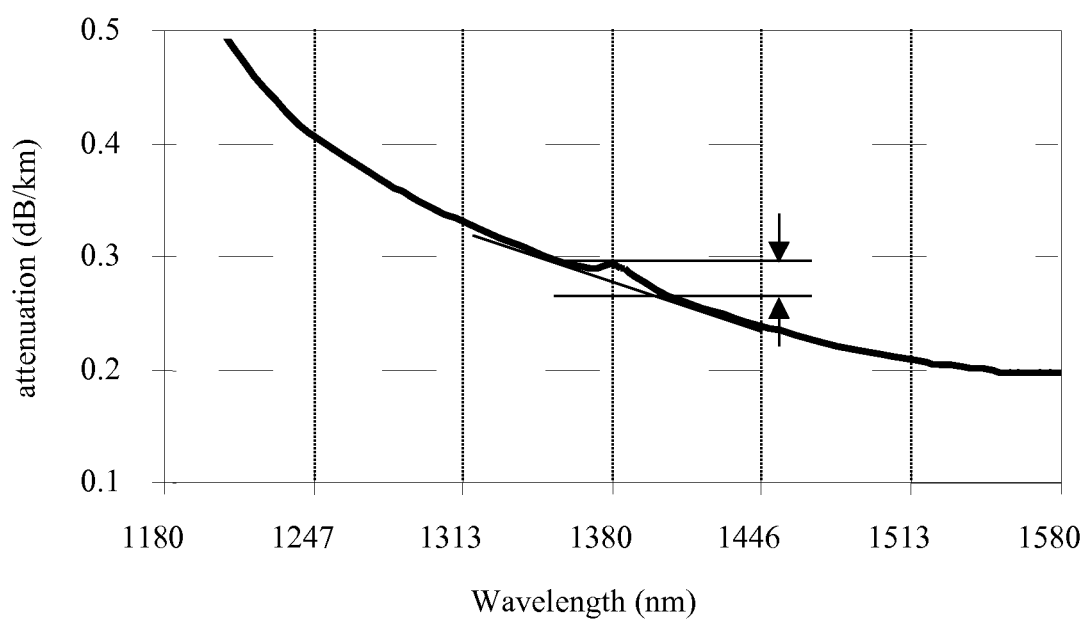
FIG. 5 is a plot showing the attenuation, in dB/km, as a function of wavelength, in nm, of an optical fibre according to an embodiment of the present invention.

FIG. 5 is a plot showing the attenuation, in dB/km, as a function of wavelength, in nm, as measured by using the PK 2200 measurement bench. The water peak at 1380 nm, indicated in the figure as the peak between the two arrows, is less than 0.03 dB/km, obtained mainly by maintaining a $Cl_2$ flow lower than 1.7 l/min during the consolidation process.

Therefore, the fibre of the present example showed excellent macrobending performances and low diameter instability.

Example 3

Nearly 75 grams of silica soot were deposited by means of an OVD process onto a $GeO_2$ doped silica glass rod of about 1 meter length and about 10.5 mm diameter with a step-index profile of the core having a relative refractive index percent, $\Delta_1$, of about 0.31% and a core/clad diameter ratio of about 0.38. The preform was subject to the same consolidation process as that of examples 1 and 2 in order to produce a fluorine-doped void-containing region containing a random distribution of voids. The fluorine doping was estimated to be equal to or greater than 0.4 wt % and less than 0.7 wt % in the void-containing region.

Nearly 6400 grams of silica soot were then deposited on the preform and sintered in a standard way in a He+$Cl_2$ atmosphere. The preform was then placed for 12 h in a holding oven at 1000° C. with Argon.

The preform was drawn on the same apparatus described in example 1, at a drawing speed of 22 m/s and a drawing tension of 180 grams. The fibre outer diameter was controlled by the on-line control system of example 1, set to maintain the outer diameter of the fibre at 125±1 μm. The average fibre outer diameter was 124.8 μm with a standard deviation of 0.25 μm, as measured by means of the on-line control system. The fibre cross-sections showed an annular region of randomly distributed holes, with an average diameter of about 1 μm or less. The thickness of the void-containing region was observed to range from 1.8 μm to 1.9 μm. The average optical properties of several fibre length sections wound up on respective bobbins were:

Zero wavelength dispersion=1316 nm
MFD=8.4 μm
Cable cut-off wavelength=1140 nm
MAC number=7.75
Macrobending @1550 nm on 10 mm diameter mandrel=1.5 dB/turn The MAC number of the fibre of the present example is larger than the MAC numbers for the fibres of examples 1 and 2. Macrobending loss is related to the MAC number and, in general, a reduction of MAC number leads to a decrease of macrobending loss, as described for example in WO 2010/031420 that shows in FIG. 13 a linear relationship between macrobending loss and MAC number. It is therefore expected, for an optical fibre having the same optical properties of the fibre of the present example, except for a lower MAC number (i.e., lower MFD and/or larger cut-off wavelength), that the macrobending loss would decrease. For example, for a MAC number of 7.2 and assuming a linear relationship between MAC number and macrobending loss, the macrobending loss at 1550 nm on a 10 mm diameter mandrel is estimated to be approximately 0.3 dB/turn.

Therefore, the fibre of the present example showed good macrobending performances and low diameter instability.

Comparative Examples

Example 4

Nearly 100 grams of silica soot was deposited by OVD onto a $GeO_2$ doped silica glass rod of about 1 meter length and about 10.4 mm diameter with a step index profile having a relative refractive index percent, $\Delta_1$, of about 0.31% and core/clad diameter ratio of about 0.35. The preform was maintained in a hot zone at about 1000° C. of the consolidating furnace, for 120 minutes in a 15 l/min He+1.7 l/min $Cl_2$ flow and then for 30 minutes in a 15 l/min Ar+1.7 l/min $Cl_2$ flow, which is maintained up to the end of the whole process. The soot cladding layer was sintered by down driving in a hot zone at 1490° C. of the consolidating furnace, at a 100° C./min temperature increase (in the Ar+$Cl_2$ atmosphere). The assembly was then re-down driven (i.e. a second time) through the hot zone at a 50° C./min temperature increase. The assembly was then re-down driven (i.e. a third time) through the hot zone at a 26° C./min temperature increase. The assembly was then re-down driven (i.e. a fourth time) through the hot zone at a 13° C./min temperature increase. The assembly was then re-down driven (i.e. a fifth time) through the hot zone at a 7° C./min temperature increase.

By the consolidation process described above, a silica soot and containing gases trapped in the soot was obtained, forming a random distribution of voids. The atmosphere during consolidation contained inert gases and $Cl_2$, in particular, no fluorine-containing gases were employed.

Subsequently, nearly 5800 grams of silica soot was deposited on the preform and sintered in a standard way in Helium+$Cl_2$ atmosphere. The preform was then placed for 12 h in a holding oven at 1000° C. in which argon was flown.

The preform was drawn on the same apparatus of example 1, at a drawing speed of 22 m/s and a drawing tension of 180 grams. The fibre outer diameter was controlled by the on-line control system of example 1, set to maintain the outer diameter of the fibre at 125±1 μm. The drawn fibre comprised an annular region containing randomly distributed voids, with an average diameter on the cross-section of less than 1 micron. The thickness of the void-containing annular region ranged from 2.8 to 3.0 μm. Optical properties of several fibre length sections wound up in respective bobbins were:

Zero wavelength dispersion=1320 nm
MFD=8.6 μm
Cable cut-off wavelength=1200 nm
MAC number=7.17
Macrobending @1625 nm on 15 mm diameter mandrel=0.35 dB/turn
Macrobending @1550 nm on 10 mm diameter mandrel=1.2 dB/turn Therefore, macrobending losses of the present fibre are much larger than those of the fibre of example 2, which has a value of MAC number close to that of the present example.

Several length spans of fibre were measured with the PK 2400 bench for geometrical measurements of previous examples. The average outer diameter was 124.85 μm with a standard deviation from the average value of 0.30 μm, which denotes a low diameter instability, compliant with a 125±0.7 μm specification.

Spectral attenuation measurements were performed on several bobbins of optical fibre by using a commercial PK 2200 measurement bench. Measured average attenuation values were:

Attenuation @1310 nm=0.333 dB/km
Attenuation @1380 nm=0.293 dB/km
Attenuation @1550 nm=0.193 dB/km Example 5

Nearly 250 grams of silica soot was deposited via OVD onto a $GeO_2$ doped silica glass rod of about 1 meter length and about 10.5 mm diameter with step index profile having a relative refractive index percent, $\Delta_1$, of about 0.31% and core/clad diameter ratio about 0.38. The preform was maintained in a hot zone at about 1000° C. of the consolidating furnace, for 120 minutes in a 15 l/min He+1.7 l/min $Cl_2$ flow and then for 30 minutes in a 15 l/min Ar+1.7 l/min $Cl_2$ flow, which is maintained up to the end of the whole process. Then, the soot cladding was sintered by down driving in a hot zone at 1490° C. of the consolidating furnace, at a 100° C./min temperature increase (in the Ar+$Cl_2$ atmosphere). The assembly was then re-down driven (i.e. a second time) through the hot zone at a 50° C./min temperature increase. The assembly was then re-down driven (i.e. a third time) through the hot zone at a 26° C./min temperature increase. The assembly was then re-down driven (i.e. a fourth time) through the hot zone at a 13° C./min temperature increase. The assembly was then re-down driven (i.e. a fifth time) through the hot zone at a 7° C./min temperature increase.

By the consolidation process described above, a silica soot and containing gases trapped in the soot was obtained. The atmosphere during consolidation contained no fluorine-containing gases.

Nearly 8100 grams of silica soot was deposited on the preform and sintered in a standard way in He+$Cl_2$ atmosphere. The preform was then placed for 12 h in a holding oven at 1000° C. with Argon.

The preform was drawn on the same apparatus of example 1, at a drawing speed of 22 m/s and a drawing tension of 180 grams. The fibre outer diameter was controlled by the on-line control system of example 1, set to maintain the outer diameter of the fibre at 125±1 μm. The drawn fibre comprised an annular region containing randomly distributed voids with an average diameter on the cross-section of less than 1 μm. The thickness of the void-containing annular region ranged from 5 to 5.2 μm. The optical properties of the fibre were (values averaged across several length sections of the fibre wound up in bobbins):

Zero wavelength dispersion=1320 nm
MFD=8.6 μm
Cable cut-off wavelength=1195 nm
MAC number=7.2
Macrobending @1625 nm on 15 mm diameter mandrel=0.075 dB/turn
Macrobending @1550 nm on 10 mm diameter mandrel=0.095 dB/turn Several spans of the fibre were measured with a PK 2400 bench for geometrical measurements. The average fibre outer diameter was 124.8 μm with standard deviation of 0.88 μm from the average value.

Therefore, the fibre of the present example having a void-containing region of thickness of about 5 μm showed a very good macrobending performance but a large diameter instability, which is not compliant with a 125±0.7 μm specification generally required for single-mode optical fibres for transmission of optical signals.

Example 6

Nearly 150 grams of silica soot is deposited via OVD onto a $GeO_2$ doped silica glass rod of about 1 meter length and about 10.9 mm diameter with step index profile having a relative refractive index percent, $\Delta_1$, of about 0.30% and core/clad diameter ratio about 0.36. The preform was maintained in a hot zone at about 1000° C. of the consolidating furnace, for 120 minutes in a 15 l/min He+1.7 l/min $Cl_2$ flow and then for 30 minutes in 15 l/min He+0.25 l/min $SF_6$+1.7 l/min $Cl_2$ flow. Then, the soot cladding was sintered by down driving in a hot zone at 1490° C. of the consolidating furnace, at a 100° C./min temperature increase in a 15 l/min He+0.25 l/min $SF_6$+1.7 l/min $Cl_2$ flow. The assembly was then re-down driven (i.e. a second time) through the hot zone at a 50° C./min temperature increase still in a 15 l/min He+0.25 l/min $SF_6$+1.7 l/min $Cl_2$ flow. The assembly was then re-down driven (i.e. a third time) through the hot zone at a 26° C./min temperature increase still in a 15 l/min He+0.25 l/min $SF_6$+ 1.7 l/min $Cl_2$ flow. The assembly was then re-down driven (i.e. a fourth time) through the hot zone at a 13° C./min temperature increase in 15 l/min He+1.7 l/min $Cl_2$ flow (He+$Cl_2$ atmosphere maintained up to the end of the process). The assembly was then re-down driven (i.e. a fifth time) through the hot zone at a 7° C./min temperature increase.

By the consolidation process in a fluorine containing atmosphere as described above, silica soot doped with fluorine was obtained. The consolidated preform was characterized with a commercial York P106 preform-analyzer that revealed a depressed-index annular region of inner diameter of about 10.9 mm and outer diameter of 14.3 mm. The relative refractive index percent of the depressed-index region, $\Delta_3$, was detected to be of about −0.25%, corresponding to about 0.7 wt % of fluorine concentration in silica. The consolidated preform was essentially void-free.

Subsequently, nearly 5800 grams of silica soot was deposited on the preform and sintered in a standard way in He+$Cl_2$ atmosphere for forming the outer cladding of the fibre. The preform was then placed for 12 h in a holding oven at 1000° C. with Argon.

The preform was drawn on the same apparatus described in example 1, at a drawing speed of 22 m/s and a drawing tension of 180 grams. The fibre outer diameter was controlled by the on-line control system of example 1, set to maintain the outer diameter of the fibre at 125±1 μm. No voids were observed in the fibre. The optical properties measured on several bobbins of the fibre were (average values are given):

MFD=9.1 μm
Cable cut-off wavelength=1130 nm
MAC number=8.05
Macrobending @1550 nm on 10 mm diameter mandrel=4.7 dB/turn The MAC number of the fibre of the present example is relatively large, and in particular larger than the values of the examples 1-3. By assuming a linear relationship between MAC number and macrobending loss, the loss value at a wavelength of 1550 nm on a 10 mm diameter mandrel is estimated to be nearly 1 dB/turn for a MAC number of 7.2.

Several spans of the fibre were measured with a PK 2400 bench for geometrical measurements. The average outer diameter was 124.95 μm with standard deviation from the average value of 0.20 μm, thus indicating very low diameter instability. However, the macrobending performance of the fibre of the present example is much worse than that exhibited by the optical fibre of example 2, which has a value of MAC number of 7.25. Table 1 summarises some main parameters of the optical fibres of the given examples.

TABLE 1

| Ex. | Void region Thickness (μm) | Fluorine Content (wt %) | Cladding Diameter (μm) | Macrobending @ 1625 on 15 mm (dB/turn) | Macrobending @ 1550 on 10 mm (dB/turn) |
|---|---|---|---|---|---|
| 1 | 2.5-2.8 | <0.7 | 124.81 ± 0.45 | 0.009 | 0.015 |
| 2 | 2.9-3.0 | <0.7 | 124.75 ± 0.35 | 0.063 | 0.075 |
| 3 | 1.8-1.9 | <0.7 | 124.8 ± 0.25 | n.d. | 0.3° |
| 4* | 2.8-3.0 | — | 124.85 ± 0.3 | 0.35 | 1.20 |
| 5* | 5.0-5.2 | — | 124.8 ± 0.88 | 0.07 | 0.09 |
| 6* | — | <0.7 | 124.95 ± 0.2 | n.d. | 1.00 |

*comparative examples
°extrapolated

The results summarised in Table 1 show that manufacturing of microstructured fibres, i.e. fibres provided with a void-containing region, may be prone to diameter instability, which may produce an optical fibre non compliant with the specifications required by the most common telecommunication standards. Instability of the outer diameter of the fibre during the drawing process was observed in optical fibres having a void-containing region of radial thickness larger than 3 μm, especially in case of thickness of about 5 μm. Without wishing to be bound to any theory or explanation, the Applicant believes that the balance between viscous stresses and surface tension of the voids in the neckdown region during the drawing process strongly affects the final void morphology and the diameter instability. Voids formed during the consolidation process of the preform are generally of spherical shape. During drawing, viscous stresses tend to significantly elongate the spherical voids in the preform, whereas surface tension, which is associated to a lower energy per unit area, tends to maintain the spherical shape of the voids. When the force of the surface tension is of the same order or larger than the viscous stress, voids behave in the neckdown region as grains in a funnel, that is, they elongate while decreasing or increasing their longitudinal speed rather than squeeze. As a result, the volume throughput of the drawn fibre is not constant but exhibits an oscillatory behaviour. On the other hand, when surface tension is negligible or much smaller in relation to the viscous stress, voids are expected to squeeze along the drawing flow and exhibit a smaller average void diameter with respect to the case of a drawn fibre in which the surface tension gives a more relevant contribution to the process.

Although it is not ruled out that fluorine doping may have some effect on the surface tension of the voids during drawing, fluorine doping is known to significantly decrease the dynamic viscosity of silica glass. The Applicant has observed that this property can be advantageous for reducing void-induced diameter instability. Always without wishing to be bound by this explanation, it is presumed that by introducing fluorine into the void-containing region, the viscosity of the region decreases and can thus less effectively transfer stresses to the surrounding silica glass of the outer cladding, which provides a cushioning effect. As a result, the outer diameter of the drawn fibre is expected to remain more unperturbed in relation to the case of a microstructured fibre having an undoped void-containing region.

The invention claimed is:

1. A single-mode optical fibre for transmitting optical signals comprising:
    a central core region for guiding the optical signals; and
    a cladding region surrounding the core region and comprising a void-containing annular region containing randomly distributed voids, the cladding having an average diameter along a length of the optical fibre,
    wherein the void-containing region is doped with fluorine at a concentration of less than 1 wt % and has a radial thickness equal to or smaller than 3 μm, such that a standard deviation of the average cladding diameter is equal to or smaller than ±0.45 μm.

2. The fibre of claim 1, wherein the fluorine concentration is equal to or greater than 0.1 wt %.

3. The fibre of claim 1, wherein the fluorine concentration is of 0.1 wt % to 0.7 wt %.

4. The fibre of claim 1, wherein the void-containing region has a radial thickness of 1.5 μm to 3 μm.

5. The fibre of claim 1, wherein the cladding region further comprises:
    an inner annular region in contact with and extending radially outwardly from the core region to the void-containing region; and
    an outer annular region in contact with and extending radially outwardly from the void-containing region.

6. The fibre of claim 5, wherein the inner annular region and the outer annular region are made of undoped silica.

7. The fibre of claim 5, wherein the core region has a first outer core radius and the inner annular layer has a second outer radius defining a core-to-clad radius ratio and the core-to-clad radius ratio is 0.33 to 0.40.

8. The fibre of claim 1, wherein the core region has a step profile with a first relative refractive index percent of 0.30% to 0.34%.

9. The fibre of claim 1, wherein the local void density is 1 vol % to 4 vol %.

* * * * *